United States Patent
Sundqvist et al.

(10) Patent No.: US 7,606,885 B2
(45) Date of Patent: Oct. 20, 2009

(54) METHOD FOR, AND A TOPOLOGY AWARE RESOURCE MANAGER IN AN IP-TELEPHONY SYSTEM

(75) Inventors: Jim Sundqvist, Lulea (SE); Anders Larsson, Lulea (SE); Joakim Norrgard, Lulea (SE); Olov Schelen, Norrfjarden (SE)

(73) Assignee: Netsocket, Inc., Plano, TX (US)

( * ) Notice: Subject to any disclaimer, the term of this patent is extended or adjusted under 35 U.S.C. 154(b) by 0 days.

(21) Appl. No.: 10/363,628

(22) PCT Filed: Sep. 3, 2001

(86) PCT No.: PCT/SE01/01876

§ 371 (c)(1),
(2), (4) Date: Jun. 5, 2003

(87) PCT Pub. No.: WO02/21797

PCT Pub. Date: Mar. 14, 2002

(65) Prior Publication Data

US 2003/0187986 A1    Oct. 2, 2003

(51) Int. Cl.
G06F 15/173 (2006.01)
(52) U.S. Cl. ............ 709/223; 709/224; 709/225; 709/226
(58) Field of Classification Search ............ 709/227, 709/224, 229, 223, 249, 225, 226; 370/401, 370/218; 455/427
See application file for complete search history.

(56) References Cited

U.S. PATENT DOCUMENTS

| | | | |
|---|---|---|---|
| 5,909,550 A * | 6/1999 | Shankar et al. | 709/227 |
| 5,915,217 A * | 6/1999 | Wiedeman et al. | 455/427 |
| 6,052,361 A * | 4/2000 | Ansari et al. | 370/232 |
| 6,173,324 B1 * | 1/2001 | D'Souza | 709/224 |
| 6,295,276 B1 * | 9/2001 | Datta et al. | 370/218 |
| 6,370,163 B1 | 4/2002 | Shaffer et al. | |
| 6,374,300 B2 * | 4/2002 | Masters | 709/229 |
| 6,434,628 B1 * | 8/2002 | Bowman-Amuah | 714/48 |

(Continued)

FOREIGN PATENT DOCUMENTS

EP    0 942 560 A2    9/1999

OTHER PUBLICATIONS

N.T. Karonis et al., "Exploiting Hierarchy in Parallel Computer Networks to Optimize Collective Operation Performance," Parallel and Distributed Processing Symposium, 2000, IPDPS 2000, Proceedings 14th International, pp. 377-384.

(Continued)

*Primary Examiner*—Tonia L Dollinger
*Assistant Examiner*—Asghar Bilgrami
(74) *Attorney, Agent, or Firm*—Slater & Matsil, L.L.P.

(57) ABSTRACT

A method and arrangement in a communications network. The object is to provide a way of handing recourse management issues and admission control within an IP telephony system. The object is achieved by a topology aware resource manager collecting routing information concerning the IP network, obtaining resource information concerning resources within the IP network, creating a resource map by combing the routing information and resource information, and performing recourse management issues and admission control within the system by the resource map and by interacting with a gatekeeper.

28 Claims, 5 Drawing Sheets

U.S. PATENT DOCUMENTS

| | | | | |
|---|---|---|---|---|
| 6,498,791 | B2* | 12/2002 | Pickett et al. | 370/353 |
| 6,563,793 | B1* | 5/2003 | Golden et al. | 370/236 |
| 6,591,301 | B1* | 7/2003 | Li et al. | 709/229 |
| 6,633,909 | B1* | 10/2003 | Barrett et al. | 709/224 |
| 6,731,642 | B1* | 5/2004 | Borella et al. | 370/401 |
| 2002/0064136 | A1* | 5/2002 | O'Neil | 370/267 |
| 2002/0099854 | A1* | 7/2002 | Jorgensen | 709/249 |

OTHER PUBLICATIONS

K. Tajima et al., "A Resource Management Architecture over Differentiated Services Domains for Guarantee of Bandwidth, Delay and Jitter," EUROCOMM 2000, Information Systems for Enhanced Public Safety and Security, IEEE/AFCEA, 2000, pp. 242-249.

R.R. Chpudhury et al., "A Distributed Mechanism for Topology Discovery in Ad Hoc Wireless Networks Using Mobile Agents," Mobile and Ad Hoc Networking and Computing, 2000, pp. 145-146.

O. Schelen et al., "Performance of QoS Agents for Provisioning Network Resources," Quality of Service, 1999, pp. 17-26.

Y. Breitbart et al., "Efficiently Monitoring Bandwidth and Latency in IP Networks," INFOCOM 2001, Proceedings, IEEE, V. 2, pp. 933-942.

Itu-T, H.323, "Packet Based Multimedia Communications Systems," Feb. 1998, Appendix II, pp. 106-113.

Siamwalla, R., et al., "Discovering Internet Topology," IEEE INFOCOM, 1999, pp. 1-16.

Oran, D., "OSI IS-IS Intra-domain Routing Protocol," Network Working Group, Request for Comments: 1142, Feb. 1990, 157 pgs.

Kessler, G., etal., "A Primer on Internet and TCP/IP Tools," Network Working Group, Request for Comments: 1739, Dec. 1994, pp. 1-46.

Moy, J., "OSPF Version 2," Network Working Group, Request for Comments: 2328, Apr. 1998, pp. 1-244.

Malkin, G., "RIP Version 2," Network Working Group, Request for Comments: 2453, Nov. 1998, pp. 1-39.

Case, J., etal., "Introduction to Version 3 of the Internet-standard Network Management Framework," Network Working Group, Request for Comments: 2570, Apr. 1999, pp. 1-23.

* cited by examiner

METHOD FOR, AND A TOPOLOGY AWARE RESOURCE MANAGER IN AN IP-TELEPHONY SYSTEM

The present invention relates to a method and arrangement in a communications network in accordance with the preambles of the independent claims. More specifically it relates to IP telephony recourse management issues and admission control within an IP telephony system.

BACKGROUND OF THE INVENTION

Telephony is one of the most important inventions in mankind. Since its birth Mar. 10, 1876, installing copper wires to each and everyone that needed communication capabilities has spread the technology worldwide. By coupling copper wires together between caller and called, a connection between these was achieved and they could eventually communicate with each other through their circuit. This kind of technology has become known as circuit-switched telephony. Anyone familiar with classical telephony know that there has been a great evolution within this circuit-switched telephony with, for instance, the AXE platform the Ericsson Corporation developed as their switching solutions. Knowledge about statistical multiplexing of calls within the networks has make it possible to build networks with worldwide coverage to limited costs.

During the last decade, the classical circuit-switched telephony service has met a competitor in the more cost efficient packet-switched telephony built upon the Internet protocol suite Transport Control Protocol/Internet Protocol (TCP)/(IP). This telephony is usually referred to as IP telephony, which currently is being standardized and frequently installed instead of the old circuit-switched telephony.

The packet-switched IP telephony networks are commonly routed using one of the well-known IP routing protocols such as OSPF (Moy J., *OSPF Version 2*, IETF, RFC2328), IS-IS (Oran D., *OSI IS-IS Intra-domain Routing Protocol*, IETF, RFC1142) or RIP (Malkin G., *RIP Version 2*, IETF, RFC2453). These protocols can be classified either as being link-state or distance vector protocols based on the algorithms they use for route computation and distribution of routing information. All routers running a link state protocol within a domain have a complete view of the network, knowing all the networks and routers within the domain. A distance vector router knows only the routers and networks in its immediate surrounding (directly connected).

Most commercial IP telephony systems follow the International Telecommunication Union-Telephony (ITU-T) Recommendation H.323. This recommendation was early adopted by major IP telephony vendors in their systems solutions. In FIG. 1, an overview of the major components in an H.323 system is shown.

These major components are terminals T, gateways G, and gatekeepers Gk. The three first components are referred to as endpoints of the H.323 system since these can initiate or terminate media streams. The gatekeeper is the manager of the H.323 system. The managing domain is referred to as a zone. There is one, and only one, gatekeeper available in each zone.

Terminals

Terminals T are endpoints that provide real-time two-way communications, i.e. it is possible to talk and listen to another H.323 terminal T or another telecommunications system via a gateway. It can also participate in a multipoint conference through the MCU, which will be introduced below. An H.323 terminal T must support the voice service. Besides the voice service, the terminal T can also provide video and data services, but these are optional. To be able to negotiate channel usage and do capability exchange between end-points, the terminal T must also support H.245. Other required components are call setup and signalling via Q.931, registration/admission/status (RAS) for gatekeeper communication, and RTP/RTCP for transportation of real-time services, e.g. voice and video.

Besides these required components, the terminal T could also have MCU capabilities.

Gateway

A gateway G is an interface between an H.323 system and another telecommunication systems, e.g. PSTN. The gateway G is optional and is only required when an endpoint communicates with other terminal types 102, e.g. ISDN, PSTN etc. The gateway G handles both the call control and the call transportation translation between the H.323 system and the non-H.323 system.

Multipoint Control Units

The multipoint control units (MCU) support conferences between three or more endpoints. The MCU comprises a mandatory multipoint controller (MC) and optionally one or more multipoint processors (MP). The MC can be co-located with another end-point, e.g. in a terminal. The MC handles negotiations between terminals during audio and video capability exchange. The MC also determines if any of the related media streams should be distributed with multicast. In case mixing of media streams are required, the MP handles this. As depicted in FIG. 2, Multipoint communication can be made either in a centralised or a decentralised manner. In centralised multipoint conferencing, all communication between endpoints E is made via the MC. In the MC, the media streams are mixed together and distributed to involved endpoints E. In decentralised multipoint conferencing, the MC handles the negotiations while the endpoints E them self distributes the media streams. This distribution can be made with the resource efficient technology multicast. A mesh of unicast media distribution can also be used. Besides the centralised and the decentralised distribution methods, hybrids between these are possible.

Gatekeeper

The gatekeeper Gk is the most important component of an H.323 enabled network. It performs two important call control functions; address translation and bandwidth management. Address translation means that the gatekeeper Gk translates from aliases for terminals and gateways to IP addresses. The bandwidth management implementation is vendor specific. A commonly used method is to specify a threshold for the number of simultaneous calls that can be made within the zone the gatekeeper Gk manages. Other methods might exist but these are in that case vendor specific. Calls can be made directly between endpoints or via the gatekeeper Gk. The latter is referred to as gatekeeper-routed calls.

Even though H.323 primarily was developed for non-guaranteed quality of service networks, the recommendation has been expanded to cover Quality of Service (QoS) issues as well. For instance, QoS Support for H.323 using RSVP is discussed in appendix II of *ITU-T Recommendation H.323 version 2, Packet-based multimedia communication systems*, Gonova, 1997.

Lack of topology awareness and path sensitive admission control is the most important drawback of current implementations of H.323 gatekeepers. In FIG. 3, a topology for an H.323 enabled network 300 is shown. In the network there are three edge routers ER, one gatekeeper Gk and one gateway G to PSTN. In this network the routers R that connects LAN segments are geographically distributed, e.g. Stockholm, Gothenburg, Malmo, etc. Between these geographically distributed routers R the bandwidth is limited. The gatekeeper Gk manages the whole network which then defines a zone. The gatekeeper Gk and the gateway G are geographically located where the number of users is highest. The gatekeeper GK could be located anywhere, but for practical reasons these are co-located. The logical location for the gateway G is to place it where most of the calls are made. This will result in less routing of calls through the rest of the network, which would be the case if the gateway G were located in a LAN segment far away from the majority of the users.

The gatekeeper Gk can be configured to allow X simultaneous calls on a heuristic basis. If the perceived quality is degraded, the threshold of simultaneous calls can be decreased. This heuristic decision base will cause problems. One user can, with or without malicious intentions, cause low overall utilisation and denial of service to other users. By starting sessions that use a thin bottleneck link, the heutistics will be adjusted to allow very few sessions in the zone. Other users that are connected with well-provisioned links will then be denied access, even if the bottleneck link would not be involved in those sessions. Other problems will occur when the usage behaviour is changed in some way, or when there are topology changes. Changed user behaviour could be that more users than usually gets their calls routed over a thin or loaded link, which could cause packet drops or increased delays. Topology change could be caused by link failure. This causes rerouting of packets meaning that the packets then take alternate paths through the network. Topology change can also be that a link characteristic is changed in some way, e.g. increased or decreased bandwidth, delay, etc.

Another problem is that gatekeeper-routed calls cannot be guaranteed high service quality in case direct calls are allowed. If a gatekeeper Gk performs bandwidth management for gatekeeper-routed calls in a zone and is unaware of simultaneous direct calls, the total traffic volume may exceed available bandwidth at some link. The problem here is that both gatekeeper-routed and direct calls use the same resources. This is due to that the gatekeeper Gk performs bandwidth management and approves bandwidth requests on gatekeeper-routed calls while direct calls can be made within the network without informing the gatekeeper about the bandwidth usage. In the case where direct calls are used within the IP telephony network, service differentiation, i.e. mechanisms in network elements that prioritise and forward important calls before less important calls, is necessary as soon as some sort of guarantees for a service is required. Gatekeeper approved calls can then be marked as important and forwarded first while direct calls are marked as less important.

For ongoing calls, problems might occur if there are additional endpoints that want to join the session and these endpoints are located on networks segments without available resources or where the available resources are not sufficient to provide predictable service. This issue will only occur when there is a multipart conference involving more than two endpoints.

Yet another problem is that different H.323 zones might be separated by non-H.323 enabled networks. Currently there are no means to provide a predictable service in this case because resources are not controlled in a non-H.323 network.

QoS support for H.323 using RSVP is currently under development. However, QoS support using RSVP is not scalable, especially not when there are calls made between endpoints in different zones where there are a non-H.323 enabled network in between. RSVP does per call signalling and reservations that would load the networks with signalling instead of useful traffic, i.e. media streams, and set-up per call state in routers.

Current H.323 systems do not allow reservations in advance, which makes it hard to plan meetings with predicted quality.

Yet another problem in the H.323 standard is that a bandwidth request is always approved or rejected. A more flexible approach between the bandwidth management functionality and the end-user is preferred.

The European patent document EP 0942560 discloses an apparatus and method for speech transport with adaptive packet size. It aims to minimize end-to-end delays caused by network traffic and low capacity routers in the network topology between two IP telephony devises. The aim is achieved by adopting packet sizes for speech transport. However, the document do not address how admission control can be done in speech transport systems, i.e. evaluating if there are sufficient capacity in the network before staring sessions and for communicating admission decisions to the system.

SUMMARY OF THE INVENTION

The object of the present invention is to provide a way of handling recourse management issues and admission control within an IP telephony system.

The above-mentioned object is achieved by a method, a resource manager and a system according to the characterising part of the independent claims.

Thanks to that the topology aware resource manager provided by the present invention, comprises means for collecting routing information concerning the IP network, means for obtaining resource information concerning resources within the IP network, means for creating a resource map by means of combing said routing information and resource information, and means for interacting with the gatekeeper it is possible for the resource manager to perform recourse management issues and admission control within the system.

The method provided by the present invention comprising the steps of:
  collecting routing information concerning the IP network;
  obtaining resource information concerning resources within the IP network;
  creating a resource map by means of combing said routing information and resource information;

makes it possible to perform recourse management issues and admission control within the system, by means of said resource map and by interacting with a gatekeeper.

Preferred embodiments are set force in the dependent claims.

An advantage of the present invention is that increased utilisation of the network that will be achieved.

Another advantage of the present invention is that it is be possible to prioritise certain traffic and still allow other traffic in the same network. This gives flexible system solutions.

Another advantage of the present invention is that it makes it possible to reserve resources in advance to allow planned meetings and events.

Yet another advantage of the present invention is that it makes it possible to allow calls with predictable quality through non-H.323 domains if these domains where QoS enabled with inter-domain communicative resource managers. It would be In these inter-zones segments resources can be reserved in advance for traffic aggregates to avoid per call signalling in these segments, i.e. trunk bandwidth. This is a very resource efficient feature of the described technology. Reservations in advance are allowed to vary over time, e.g. reserve more bandwidth during working hours and less otherwise. In other words, the user of the described technology can schedule resources by predicting the resource need over time.

A further advantage of the present invention is the flexible interaction between service provider and end-user that a full resource map can provide if this is a customer need.

BRIEF DESCRIPTION OF THE DRAWINGS

FIG. 1 shows an overview of the major components in an H.323 system according to the state of the art.

FIG. 2 is a diagram depicting multipoint communication according to the state of the art.

FIG. 3 is a block diagram illustrating a topology for an H.323 enabled network according to the state of the art.

DETAILED DESCRIPTION OF PREFERRED EMBODIMENTS

Figure 1:
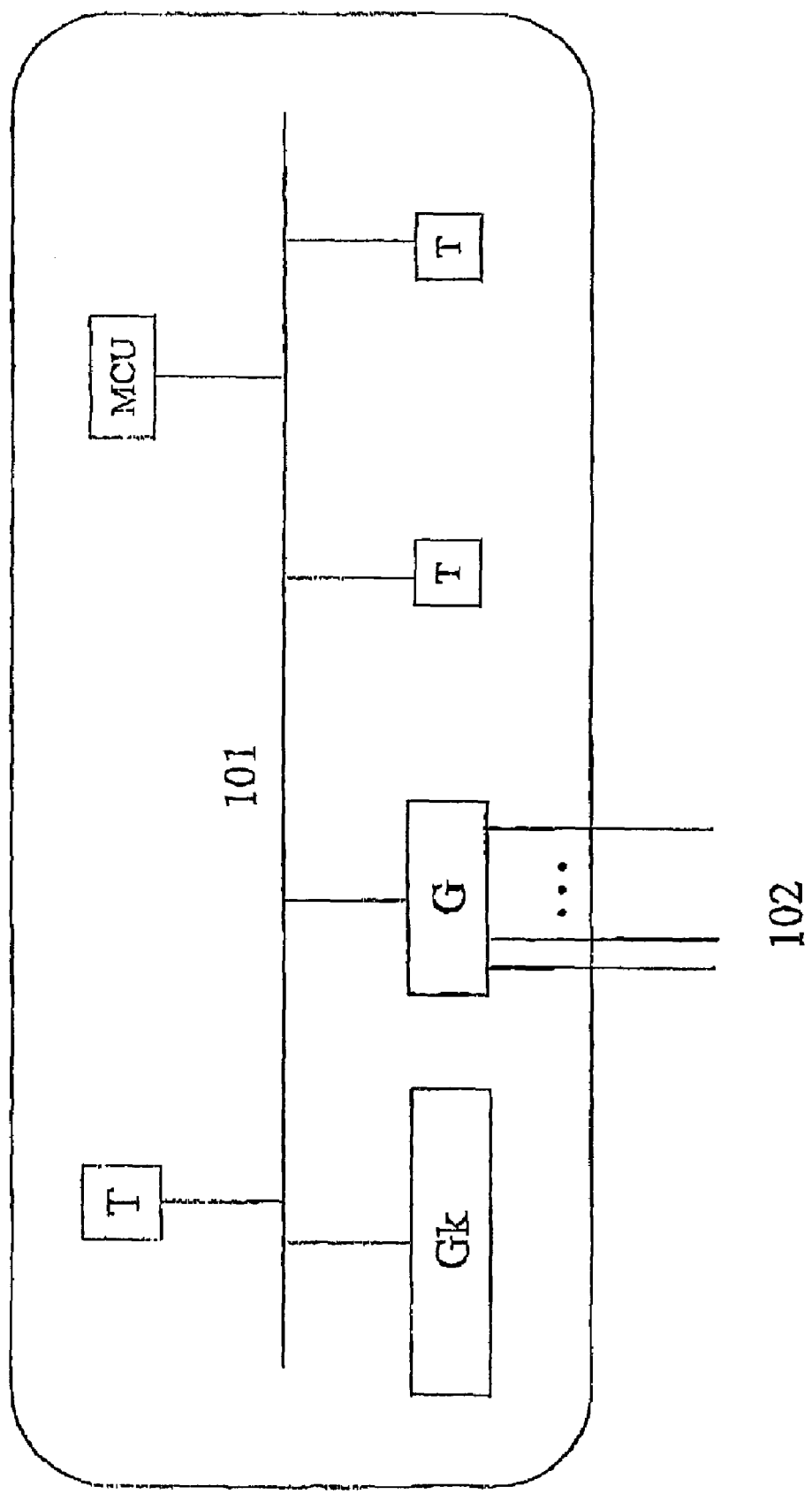
FIG. 1-3 are related to the state of the art and are described above.
Figure 2:
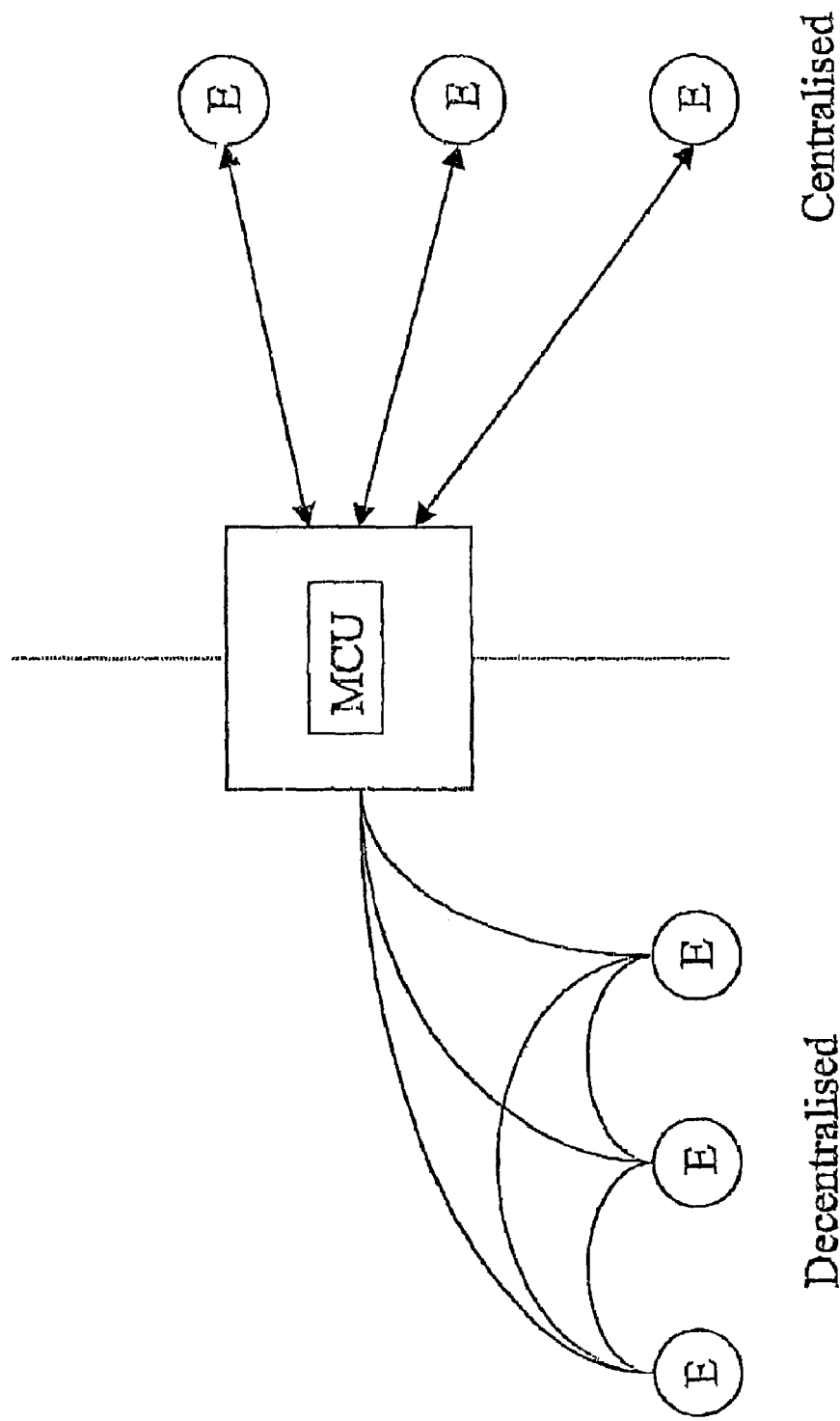
Figure 3:
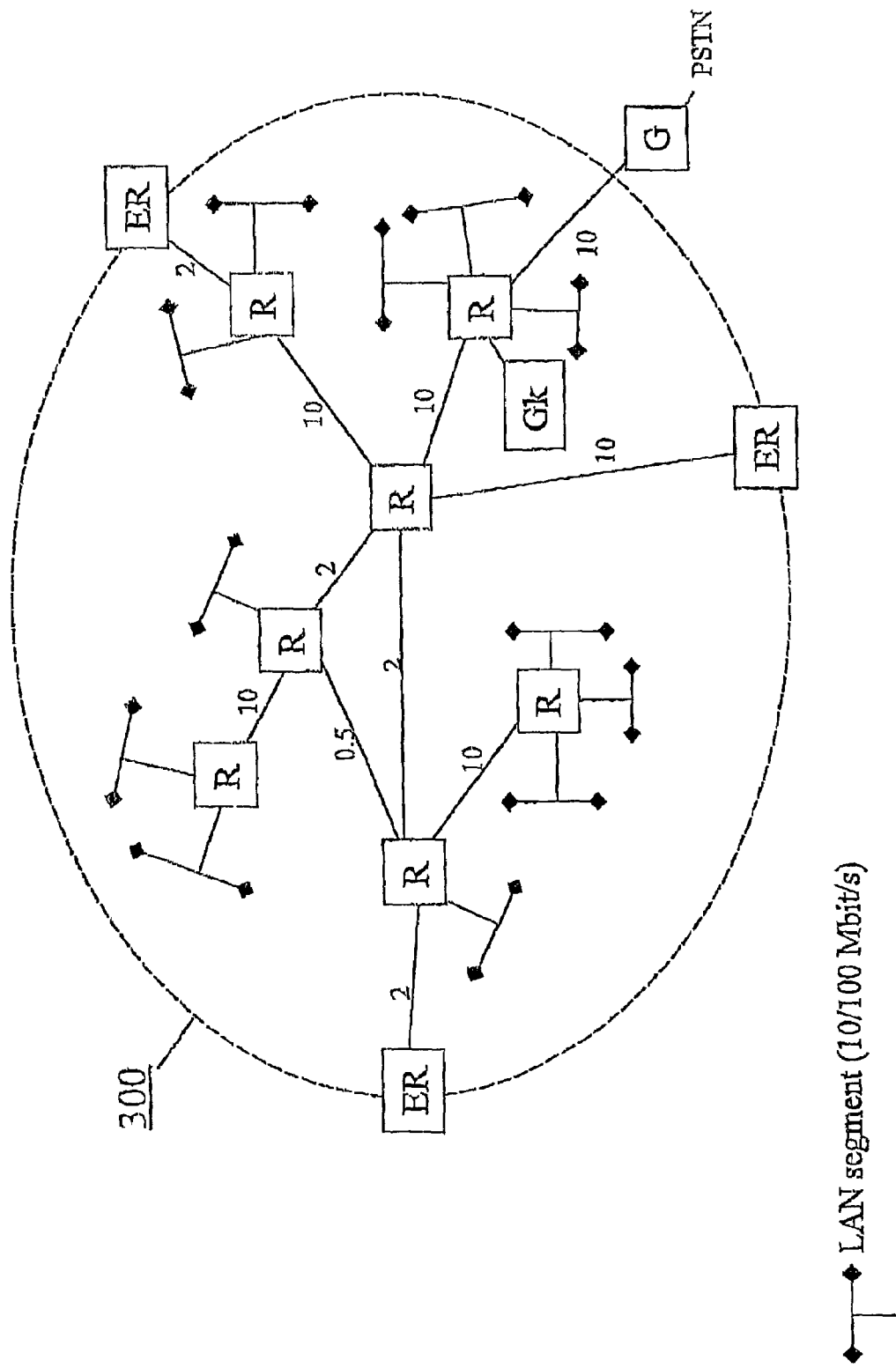
Figure 4:
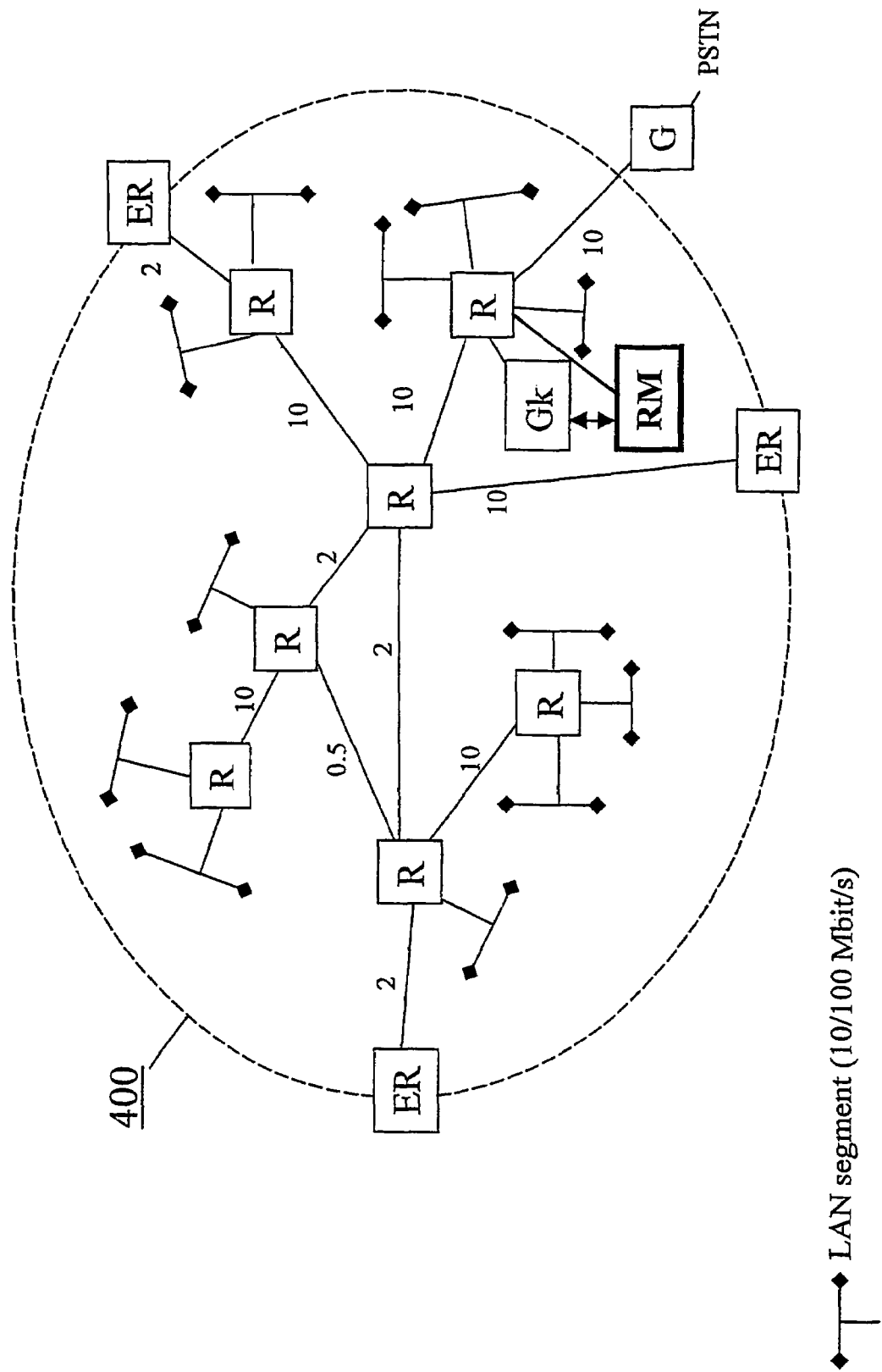
FIG. 4 is a block diagram illustrating an exemplary topology aware resource manager entity RM within an IP telephony system, according to a first embodiment of the present invention.

FIG. 4 is a block diagram illustrating an exemplary topology aware resource manager entity RM within an IP telephony system 400, according to a first embodiment of the present invention. The resource manager RM comprises topology aware resource manager functionality. It is comprised in an IP telephony system e.g. an H.323 system. Such a system is described FIG. 1, above under "background of the invention". Hence, in addition to the resource manager RM, the IP telephony system typically comprises IP telephony components such as one or many gatekeepers Gk, gateways G, and terminals, as well as IP network elements such as routers R, edge routers ER and Local Area Network (LAN) segments to which the terminals typically are connectable. The IP telephony system (400) is used to enables end-users to use an IP network as the transmission medium for multimedia.

The resource manager RM interacts with the gatekeeper Gk and handles all resource management issues for initiated and ongoing calls and admission control for call set-up requests. The interaction between the RM and the Gk can be implemented in a number of ways, e.g. via a communication protocol, inter process communication, functional calls between integrated software modules, etc.

Topology awareness is the availability of correct routing and resource information, which is essential to a system which performs resource management and admission control. The resource manager RM retrieves routing information concerning the IP network, i.e. the topology of the IP network.

In the case wherein the IP network is routed using link-state routing protocol, the resource manager RM participates in the routing and acts as a router, i.e. the RM peers with other routers, without advertising any routers of its own, to retrieve routing information of the IP network. The basic principle on which link-state protocols are built ensures that all routers have the complete routing information. When participating in the routing protocol, the resources manager RM receives the routing information as fast as any other router in the routing domain and can therefore detect changes in the topology instantly.

In the case wherein the IP network is routed using a distance vector protocol, or static routing, the method of peering cannot be used. In this case, the routing information is retrieved by measurements such as trace route (See Kessler G., *A Primer on Internet and TCP/IP Tools*, IETF, RFC1739) and/or the use of Simple Network Management Protocol (SNMP) auto discovery (see Kesbav et Al, *Discovering Internet Topology*, http://www.cs.cornell.edu/skesbav/papers/discovery.pdf, July 1998). SNMP is a set of protocols for managing complex networks. When the resource manager RM has retrieved the routing information, it uses a network management protocol, such as SNMP (see Case et Al, *Introduction to Version 3 of the Internet-standards Network Management Framework*, IETF, RFC2570), to collect information on the routers and their interfaces (e.g. the interface type and speeds). The information is used by the RM to complement the gained routing information and make sure that it has an accurate routing topology. The resource manager RM combines the routing information and resource information it gets from call set-up requests from the Gk to create a resource map. The resource map contains information of how much resources (e.g. bandwidth) that are available and reserved over time on a per link basis. The resource manager RM uses the resource map to assist the gatekeeper Gk in the decision whether there are resources available or not, for a call that someone is initiating.

In the case of gatekeeper-routed calls, the gatekeeper Gk is responsible for approving or rejecting initiated calls from terminals. The gatekeeper Gk interacts with the resource manager RM and asks the resource manager RM if there will be enough resources through the routed path between the source endpoint and the destination endpoint of an initiated call, to give the predictable quality. The resource manager RM answers the question by evaluating what network path the call will use and for each link along that path it calculates if there are sufficient resources to admit the call, i.e. the resource manager RM performs path-sensitive admission control on the resource request. The admission control is performed based on the information in the resource map. This will solve the above-mentioned problem addressed as the changes in user behaviour. No heuristic model can cope with changes in user behaviour, but the topology aware resource manager RM does that by being up to date about the resource utilisation. The same goes for the problem with denial of service.

Another problem addressed above is the changes in topology. The resource manager RM monitors on-going calls in the IP telephony system and recalculates the resource usage per link whenever any change occurs i.e. updates the resource map. If the updated resource map show that resources are too limited to be able to fulfil all on-going calls the resource manager RM will report this to the to the gatekeeper Gk. If the resources are limited as just described, it is possible to let either the resource manager RM or the gatekeeper Gk prioritise which calls that should be kept and which to terminate. BY performing this prioritisation, degraded quality for everyone involved is avoided. This prioritisation also makes the number of lost calls minimised. Another way to prioritise services whenever topology changes occur is to let video streams gets lower priority compared to the voice service.

Figure 5:
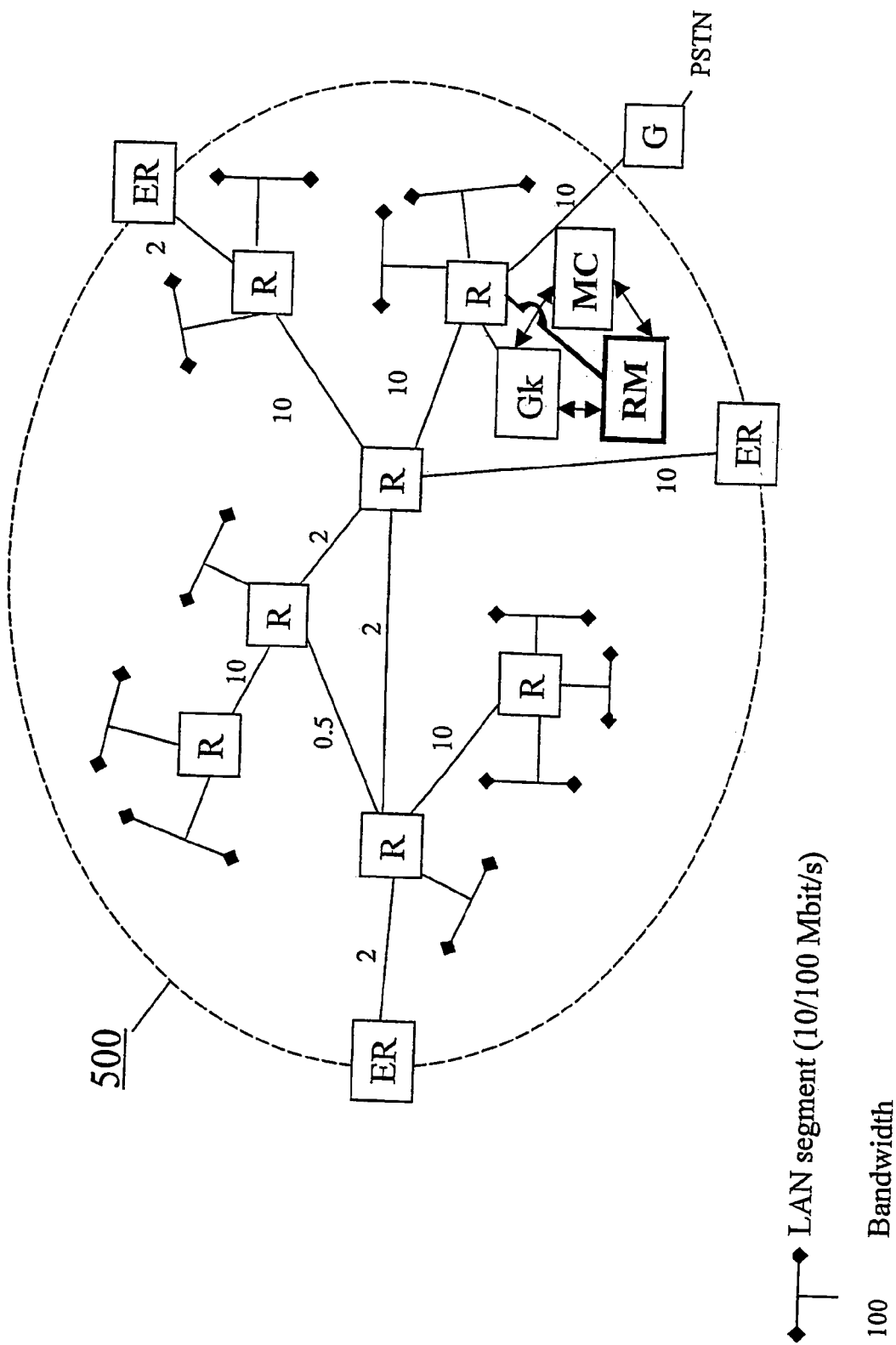
FIG. 5 is a block diagram illustrating an exemplary topology aware resource manager entity RM within an IP telephony system 500, according to a second embodiment of the present invention.

FIG. 5 is a block diagram illustrating an exemplary topology aware resource manager entity RM within an IP telephony system 500, according to a second embodiment of the present invention. In this second embodiment, the resource manager RM is used in a multipart conferencing scenario involving more than two endpoints. Within a multipart conferencing there will always be a multipoint controller MC involved in the communication. The IP telephony system shown in FIG. 5 is the same typically IP telephony system as the one in illustrated in FIG. 4 except for that it additionally comprises a multi-point controller MC. The system may comprise more than one multi-point controller. The multi-point controller MC has knowledge about which endpoints that participates in the multipart conference and the MC will also control these endpoints. The resource manager RM provides the admission control to the multi-point controller MC, either directly or indirectly via the gatekeeper Gk, in the same way as provided to the Gk as describe above. The resource request may in this case contain more then two endpoints.

In a multipart conferencing call, a task to add participants as resource efficiently as possible arises. In this case, the resource manager RM recommends the multi-point controller MC, by means of the resource map, which distribution method (centralised/decentralised or an appropriate hybrid between these) to use to make it possible for the added part to join the session in a resource efficient manner. The distribution method to use is depending on the resource map and hence, only the resource manager RM has the possibility to answer this.

In case there are no resources available with predictable quality, different methods to handle this exists. The user can get service without priority or the user can be rejected to participate in the conference due to lack of resources.

In case different priorities are used, there must be either two multicast sessions of which one is prioritised and the other is not, or a separate unicast session to the part that suffers from lack of resources.

In the multicast case, the part with less predictable resources must listen to the session without priorities and the traffic will therefore never be distributed to that part of the network.

In the unicast case, one part of the session can relay its traffic as unicast without priority to the part with lack of predictable resources.

For both the unicast case and the multicast case, the bandwidth request is approved or rejected. From an end-user point of view it is more convenient to have a reject with conditions, which is possible when using the resource manager RM according to the present invention.

For instance, the end-user requests for 64 kbit/s voice service and 128 kbit/s video service. The available resources are not sufficient to fulfil this request but only 128 kbit/s is available which is found out by the resource manager RM by means of the resource map. The answer from the resource manager RM could then be e.g. "Your request cannot be fulfilled, only 128 kbit/s can be reserved for you. Please respond to this message within 5 minutes to reserve these 128 kbit/s." A preliminary booking of resources is made by the resource manager RM, based on the original request from the gatekeeper Gk or multi-point controller MC. This preliminary booking request is then cancelled unless there is a response to the message sent from the resource manager RM to the gatekeeper Gk or MC. For the end-user, it is then possible to select which service to prioritise in favour of the other. I.e. that is in case there is a wish to put either of the services in favour of the other. The same goes if only one service is considered. The user wants e.g. to run high-quality voice, but due to lack of resources he accepts medium-quality voice with predictable quality rather than high-quality voice without possibilities to predict the quality.

Even though the state of the art describes H.323 and the solution according to the present invention is adapted to that recommendation other similar IP telephony solutions are possible, e.g. there exists a competing IP telephony solution according to the IETF standard SIP where the same solutions are applicable.

The resource manager RM comprises means for performing the methods steps described above.

The resource manager functionality is implemented by means of a computer program product comprising the software code means for performing functionality. The computer program is run on a standalone server interacting with gatekeepers, or is run on the same hardware as the gatekeeper functionality. It can be integrated with software that implements gatekeeper functionality, it may also run on routers or other network entities. The resource manager functionality may also be distributed to run on multiple nodes and/or distributed geographically over a network. The above is also applicable for interaction with other entities performing the same functionality as gatekeepers. The computer program is loaded directly or from a computer usable medium, such as a floppy disc, a CD, the Internet etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A topology aware resource manager (RM) within an Internet Protocol telephony system for transmission of multimedia over an IP network, the resource manager comprising: a computer program deployed on a standalone first server, the first server being connected to an IP telephony network and through a first connection to a gatekeeper (Gk), the gatekeeper residing on one of i) a second server connected to the IP network and ii) a router of the IP network and connected to the resource manager via the IP network, such that, via a second connection of the first server and via the IP network, the gatekeeper is connected to the first server, the IP network being routed using one of i) a link state routing protocol, ii) a distance vector protocol, and iii) a static routing; the computer program deployed on the first server providing, within the first server, a routing collection means for collecting routing information concerning the IP network, the routing information collection being from the network through the second connection and without passing through the gatekeeper, with at least one of trace route and Simple Network Management Protocol auto discovery being used by the routing collection means to retrieve the routing information of the IP network for the IP network being routed using the distance vector protocol or the static routing, by peering with the router via the second connection being used by the routing collection means to retrieve the routing information of the IP network for the IP network being routed using the link-state routing; the computer program deployed on the first server providing, within the first server, a resource collection means for collecting resource information concerning resources within the IP network, the resource information collection being retrieved directly from the network through the second connection and without passing via the gatekeeper, the resource information comprising available bandwidth of each resource within the IP network; the computer program deployed on the first server providing, within the first server, a resource map means for creating a resource map by combining said collected routing information and said obtained resource information; and the computer program deployed on the first server providing, within the first server, a management means in communication with the gatekeeper for performing path sensitive resource management issues and admission control within the IP telephone system by using bandwidth information from said resource map, on a voice call link being initiated in response to voice call set-up requests received from the gatekeeper (Gk), including using the resource map in a decision whether sufficient bandwidth resources are available for admitting a present call link being initiating.

2. The resource manager (RM) according to claim 1, wherein, each call set-up request, from the gatekeeper to the management means, includes a resource request concerning available bandwidth from a first point to a second point of the call being set-up.

3. The resource manager (RM) according to claim 1, wherein the IP system is routed using link-state routing protocol, the resource manager (RM) comprises means for participating in the routing and acting as a router within the system (400) without advertising any routes of the resource manager, to retrieve routing information of the IP network.

4. The resource manager (RM) according to claim 1, wherein,
the IP network is routed using a distance vector protocol, or static routing, the resource manager (RM) comprises means for using measurements by Simple Network Management Protocol (SNMP) auto discovery to retrieve routing information of the IP network.

5. The resource manager (RM) according to claim 1, further comprising means for using the resource map for evaluating what network path an initiated call between a source endpoint and a destination endpoint within the system (400) will use.

6. The resource manager (RM) according to claim 1, wherein,
Said decision whether sufficient bandwidth resources are available for admitting the present call link being initiating includes a bandwidth resource calculation reported to the gatekeeper (Gk),
the gatekeeper interacts with the resource manager, by making the resource requests, to question the resource manager if there is sufficient bandwidth resources available through the routed path between a source endpoint and a destination endpoint of an initiated call, and
the resource manager answers the question by evaluating what network path the call will use and for links along that path it calculates if there are sufficient bandwidth resources available to admit the call, the admission control performed based on the bandwidth information in the resource map.

7. The resource manager (RM) according to claim 1, further comprising means for updating the resource map by monitoring on-going calls in the IP telephony system and recalculating the bandwidth resource usage per link whenever topology change occurs within the system (400).

8. The resource manager (RM) according to claim 7, wherein the resource map shows that the bandwidth resources are too limited to be able to fulfill all on-going calls, the resource manager (RM) comprises means for prioritising which calls that should be kept and which to terminate.

9. The resource manager (RM) according to claim 7, wherein the resource map shows that the resources are too limited to be able to fulfill all on-going calls, the resource manager (RM) comprises means for reporting this to the gatekeeper (Gk), making it possible for the gatekeeper (Gk) to prioritise which calls that should be kept and which to terminate.

10. The resource manager (RM) according to claim 1, wherein it is used in a multi part conference scenario involving more than two end-points within the system (500) which system further comprises a multi-point controller (MC), the resource manager (RM) comprising means for interacting with the multi-point controller (MC) for performing said resource management issues and admission control.

11. The resource manager (RM) according to claim 10, wherein said interaction with the multi-point controller (MC) is performed via the gatekeeper (Gk).

12. The resource manager (RM) according to claim 10, wherein bandwidth resources are available, but not enough to fulfill the amount of resources requested in a call initiation, the resource manager (RM) comprises means to reject the call with conditions, by offering said available resources to the initiator of the call.

13. An Internet Protocol (IP) telephony system comprising a gatekeeper (Gk), one or more routers (R) and multiple a plurality of end-points characterised in that the system further comprises a topology aware resource manger (RM) according to claim 1.

14. A method for handling performing resource management issues and admission control within an Internet Protocol IP telephony system (400) adapted for transmission of multimedia over an IP network, the system (400) comprising a topology aware resource manager (RM) realized by a computer program deployed on a standalone server connected to the IP network and, via the IP network, connected to a gatekeeper; characterized in that the method comprises the following steps to be performed by the resource manager (RM): collecting routing information concerning the IP network, said routing information being collected using measurements including at least one of link-state routing, trace route and the Simple Network Management Protocol (SNMP) auto discovery; obtaining resource information concerning resources within the IP network, the resource information comprising available bandwidth of each resource; creating a resource map by means of combining said routing information and resource information; and performing path-sensitive resource management issues and admission control within the system (400) using the obtained bandwidth information of said resource map and responsive to set-up requests received from a gatekeeper (Gk), wherein said collecting routing information concerning the IP network does not involve the gatekeeper, and the resource manager in communication with the gatekeeper, performs, on a voice call link being initiated in response to voice call set-up requests received from the gatekeeper (Gk), the path-sensitive resource management issues and the admission control within the IP telephone system by using bandwidth information from said resource map in a decision whether sufficient bandwidth resources are available for admitting a present call link being initiating; the gatekeeper residing on one of i) a second server connected to the IP network and ii) a router of the IP network and connected to the resource manager via the IP network, such that, via a second connection of the first server and via the IP network, the gatekeeper is connected to the first server.

15. The method according to claim 14, comprising the further step of the resource manager (RM) obtaining resource information from the call set-up requests from the gatekeeper (Gk).

16. The method according to claim 14, wherein the IP system is routed using link-state routing protocol, the method comprising the further step of:

the resource manager (RM) participating in the routing and acting as a router within the system (400) without advertising any routes of its own, to retrieve routing information of the IP network, and.

17. The method according to claim 14, wherein the IP network is routed using a distance vector protocol, the method comprising the further step of:
the resource manager (RM) using measurements by Simple Network Management Protocol (SNMP) auto discovery to retrieve routing information of the IP network.

18. The method according to claim 14, comprising the further step of:
using the resource map for evaluating what network path an initiated call between a source endpoint and a destination endpoint within the system (400) will use.

19. The method according to claim 14, comprising the further step of:
calculating, for each link along that path, if there are sufficient resources to admit the call.

20. The method according to claim 19, comprising the further step of: reporting said calculation to the gatekeeper (Gk).

21. The method according to claim 14, comprising the further step of:
the resource manager (RM) updating the resource map by monitoring on-going calls in the IP telephony system and recalculating the resource usage per link whenever any change occurs within the system (400).

22. The method according to claim 21, wherein the resource map shows that the resources are too limited to be able to fulfill all on-going calls, the method comprising the further step of: the resource manager (RM) prioritising which calls that should be kept and which to terminate.

23. The method according to claim 21, wherein the resource map shows that the resources are too limited to be able to fulfill all on-going calls, the method comprising the further step of: the resource manager (RM) reporting this to the gatekeeper (Gk), making it possible for the gatekeeper (Gk) to prioritise which calls that should be kept and which to terminate.

24. The method according to claim 14, wherein it is used in a multi part conference scenario involving more than two end-points within the system (500), which system further comprises a multi-point controller (MC), the method comprising the further step of:
the resource manager (RM) interacting with the multi-point controller (MC) for performing said resource management issues and admission control.

25. The method according to claim 24, wherein said interaction with the multi-point controller (MC) is performed via the gatekeeper (Gk).

26. The method according to claim 24, wherein resources are available, but not enough to fulfill the amount of resources requested in a call initiation, the method comprising the further step of:
the resource manager (RM) rejecting the call with conditions, i.e. by offering said available resources to the initiator of the call.

27. A computer readable storage medium storing a computer program product directly loadable into the internal memory of a processing means within a topology aware resource manager within an IP telephony system (400) system, comprising the software code means executable by a computer to control the computer for performing the steps of claim 14.

28. A computer program product stored on computer usable medium, comprising readable program for causing a processing means in topology aware resource manager (RM) within an IP telephony system (400) system, to control an execution of the steps of claim 14.

* * * * *